United States Patent [19]

Sumner

[11] 4,109,480
[45] Aug. 29, 1978

[54] UNDER WATER CRANE

[75] Inventor: Maurice N. Sumner, Houston, Tex.

[73] Assignee: The Sea Horse Corporation, Houston, Tex.

[21] Appl. No.: 588,761

[22] Filed: Jun. 20, 1975

[51] Int. Cl.² ............................................. F16L 1/00
[52] U.S. Cl. .................................... 61/114; 61/112; 61/110; 61/107; 182/2
[58] Field of Search ................... 61/72.1–72.6, 61/69 R; 29/237, 234, 200 P; 182/2; 254/29, 95, 97, DIG. 6; 228/44.5, 49; 214/1 P, 1 PA

[56]  References Cited

U.S. PATENT DOCUMENTS

| Re. 27,745 | 8/1973 | Brooks et al. ............ 61/69 R X |
| 1,848,828 | 3/1932 | Griffin ........................ 244/116 |
| 1,979,782 | 11/1934 | Wiley et al. ................ 61/69 R |
| 2,024,587 | 12/1972 | Lehmann ................ 244/115 X |
| 3,204,417 | 9/1965 | Robley ........................ 61/73.3 |
| 3,267,682 | 8/1966 | Robley ........................ 214/1 PA |
| 3,508,410 | 4/1970 | Lynch ........................ 61/72.3 X |
| 3,578,233 | 5/1971 | Meister ...................... 61/72.3 X |
| 3,659,299 | 5/1972 | Davidson et al. ............ 114/54 |
| 3,717,000 | 2/1973 | Rothwell .................... 61/69 R |
| 3,774,286 | 11/1973 | Reed .......................... 29/234 |
| 3,785,160 | 1/1974 | Banjavich et al. ........ 61/69 R X |

FOREIGN PATENT DOCUMENTS 300,161  11/1928  United Kingdom ............ 244/115

Primary Examiner—Dennis L. Taylor
Attorney, Agent, or Firm—Kenneth H. Johnson

[57] ABSTRACT

A system of submarine cranes suited to handling pipe, fittings, tools and machinery on the marine floor, as by divers, and having simple articulate carrying crossbeams with hydraulic motive means and controls, and possible balloon assistance and means to hump and bend, couple, and repair pipelines and machines under water.

9 Claims, 8 Drawing Figures

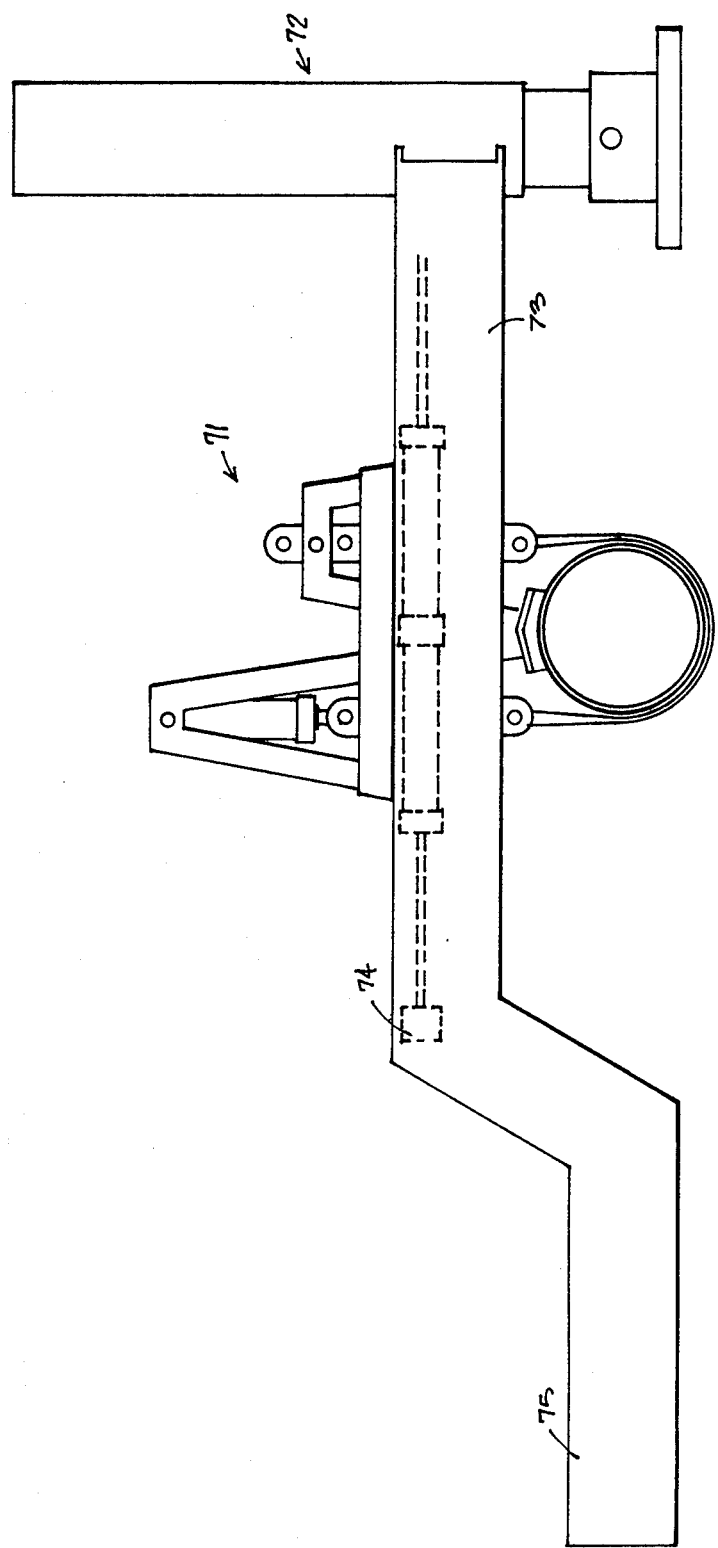

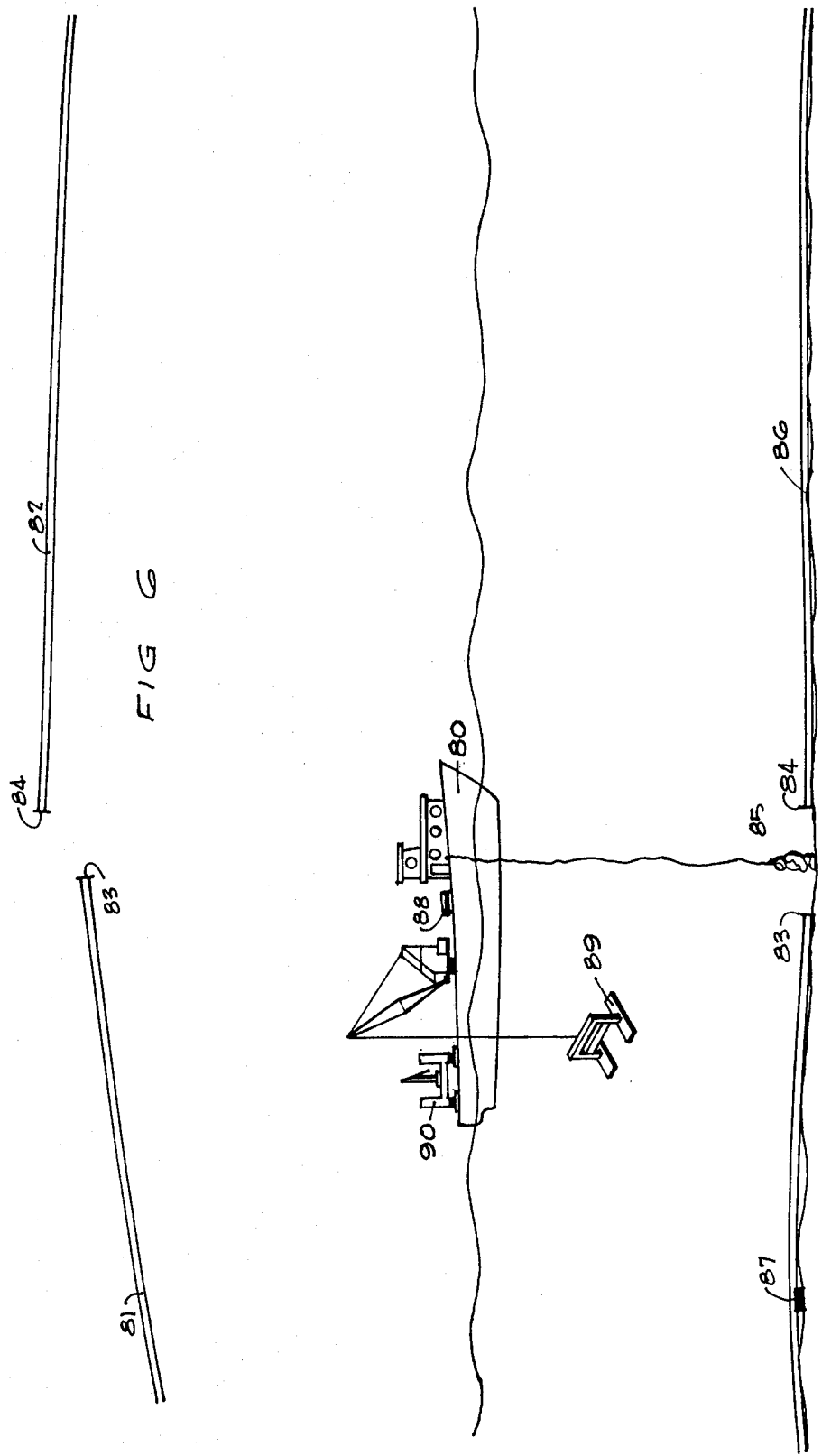

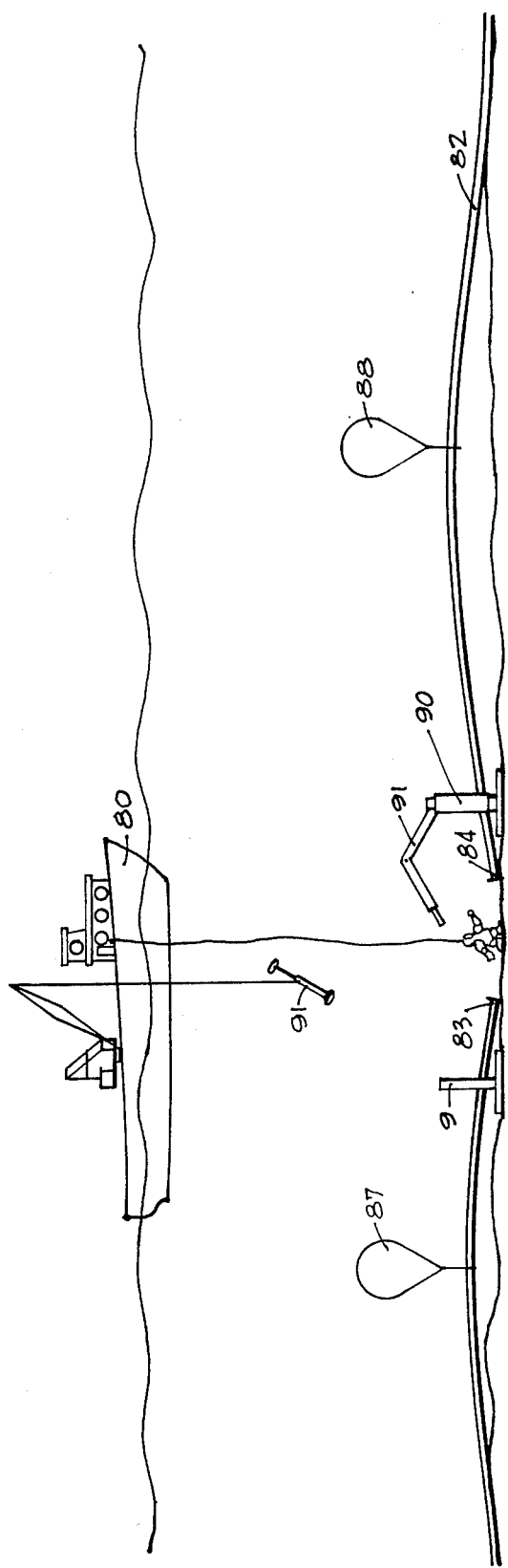

UNDER WATER CRANE

BACKGROUND OF THE INVENTION

The present invention relates to an apparatus for handling pipe fitting, tools, and other apparatus located on the marine floor. In particular the present invention relates to a crane for holding and manipulating pipe.

Enormous expense and effort are given to extraction of oil from submerged lands, and much new apparatus and technique is arising therefrom. Large pipelines are laid on the marine floor by elaborate, costly vessels which form continuous pipe and feed it over the stern, using highly developed technique. The prior art does not offer fully satisfactory methods or apparatus to connect such pipe at its end after it is laid.

The pipe being laid is of very large proportions for example 36 to 48 inch diameter. Hence, the problems are of equal proportion. Since current exploration and oil development are going on in the most hostile environments which exist on the face of the earth, it is not infrequent that the laying of the pipeline must be terminated and the pipe cut loose and dropped from the vessel in order for the vessel to move out of the way of a storm, for example in the North Sea or one of the areas off Alaska coast such as Cook Inlet. These interruptions as well as the completion of the laying operation and the joining of the laid pipe to either another pipe or to some other connection means that these problems of handling the end of the pipe under the marine surface, at the marine floor, occur frequently.

When a pipeline laying has been completed or interrupted, its loose unconnected end lies on the marine floor, probably out of line with a few feet from a fitting, perhaps on another pipe, or coupling point. The mating ends are misaligned and separated, perhaps by several degrees and several feet, (up to a few hundred feet) and the ends may be partly buried in the soil. In the prior art, two approaches have been used to align the pipe and make the connection. There is the cheap, dangerous approach of sending a diver down, then wrestling the pipe around by means of shipboard crane with lines extending to the pipe and then hoping that the diver can, using traditional tools for dry land work, make the connection. The movement of the ship makes this difficult and dangerous Then there is the incredibly expensive approach of using a unitary diving manipulator, having air locks and pipe handling claws and bending devices, elaborate controls, and highly automated coupling devices. The present invention overcomes many of the disadvantages in the prior art, by providing apparatus intermediate in cost but superior in capability.

Just as there are two handling apparatus schemes in the prior art, so are there two fitting schemes. The first and simpler method is to move the pipe, by some means, to an approximately aligned position, measure and guage the opening, then to fabricate a spool piece or other fitting on the deck of an attending vessel. This method has the disadvantage of requiring accurate measurement and of requiring that the laid pipe not be moved after guaging. It is sometimes difficult to insert the spool piece, which had to be precisely made, without causing motion of the pipe ends, thereby misaligning them, or damaging them or without dragging dirt into the coupling.

This method is probably the best since it is the simplest. Very frequently simple flange connections are employed. The more expensive and elaborate fitting schemes all provide for adjustable and costly and often unreliable couplings, perhaps including ball joints, telescoping fittings, or bias-cut revolving flanges. Each of these fittings seems reasonable for applications, but the present invention provides improvement, either for installation of fixed or adjustable fittings.

The elaborate adjustable couplings have been widely accepted and used in the art, for two principle reasons. The first reason is that almost no suitable means existed when the sudden almost explosive exploration in the North Sea began. And a second consideration was the prospect that the expensive adjustable fittings formed absolutely tight seals, wherein there would be no leak and the seals would create a joint stronger that the original pipe. It has been found that there are leaks, which are of a small extent and probably at the present rate are of no environmental consequence. However, the exploration companies are no longer satisfied with paying enormous amounts of money for devices which function possibly not as well as simpler devices. Furthermore, now that there has been a period of study and appreciation of the problem, a more careful and logical approach to the engineering aspects of undersea operations has been possible with the result that among others that the present invention has occurred.

In background, the reader should consider the difference between cranes for use on land and those for use under water in pipeline work. A crane for use in air must be able to lift loads vertically, but is not required to exert lateral pressure. Underwater cranes must resist currents, which will exert large forces on large objects. A crane ashore usually is mobile; a crane on the marine floor need not be, since it is attended by vessels, all of which themselves have cranes which can place the crane on the marine floor near its work. A crane in air may have exposed mechanism; a submerged crane must have simple, corrosion resistant bearings and mechanisms, or must be housed in costly ways.

Because of the lateral current force problem, buoyant devices such as balloons, are not useful when used alone. There must be lateral restraints and lateral motive means.

A feature of the invention is to provide method and apparatus for coupling pipes and installing devices by crane means on the marine floor, with improved costs, safety, and reliability. Particular advantages include provision of improved means:
1. to align two ends of submarine pipeline for coupling
2. to manipulate and adjust pipe fittings
3. to lift damaged pipe for repair.
4. to provide tool handing means to a diver
5. to provide for remote and precise control of coupling processes
6. to provide means for handling pipes and any other equipment which may be attached to pipe or used while working on a pipeline.

SUMMARY OF THE INVENTION

Briefly the present invention in apparatus is a crane for use under water comprising, a beam movable in a generally vertical direction, a powered thrusting means for raising and lowering the beam, a footing means articulately connected to said beam thereby allowing unequal raising and lowering of the beam, a sled slidably mounted on said beam, a thrusting means for lateral movement, mounted to the beam, means coupling the sled to the lateral powered thrusting means and means for suspending objects from the sled.

In one embodiment a beam is movably mounted in the frame and guided by columns forming apart of the frame, with the beam being attached to raising and lowering hydraulic rams by articulate couplings, thereby allowing the beam to raise and lower at an unequal rate over its length, i.e., the hydraulic rams do not have to be synchronized. The ends of the beam are rounded. The rounded ends of the beam will bear against the surface of the columns without binding, the beam in effect rotates on the rounded surface against the column if the ends do not move at the same rate.

In another embodiment the beam is a part of the frame and hydraulic rams are mounted in columns. The rams are attached to legs which move inside the columns. The legs are articulately attached to footing members, thereby allowing unequal vertical movement as in the embodiment described above. A simpler form of this embodiment employs one column and one hydraulic ram with the frame extending to form the second leg and footing member.

The thrusting means may be any of those known in the prior art such as hydraulic ram, jack screw, rack and pinion or the like. Hydraulic rams have been found to be quite suitable for under water work. The thrusting means may be independently powered.

A particular feature is a rotary mounted telescoping boom mounted on the sled. A novel combination is a balloon assist. This is one or more balloons attached to the boom to increase its lifting power. The balloons may be filled with any gas such as air, oxygen, nitrogen, helium, etc.

DRAWINGS

FIG. 5 is another alternate and simpler embodiment of the portal crane of the present invention.

FIGS. 6, 7 and 8 are schematic representations of methods of underwater pipe line handling employing the apparatus of the present invention.

DETAILED DESCRIPTION OF THE INVENTION AND PREFERRED EMBODIMENTS

Figure 1:
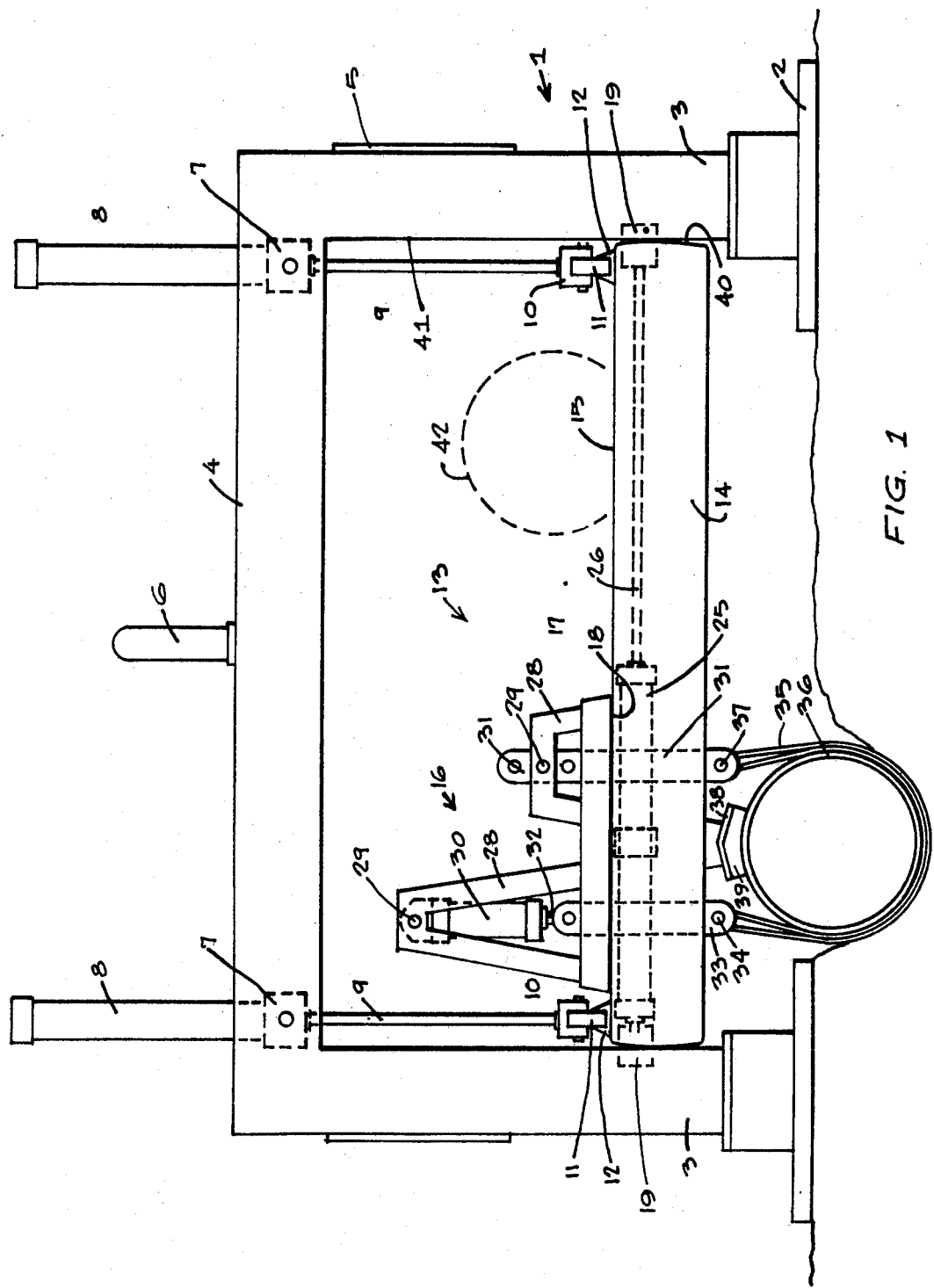
FIG. 1 is a front elevation of the portal crane of the present invention.
Figure 2:
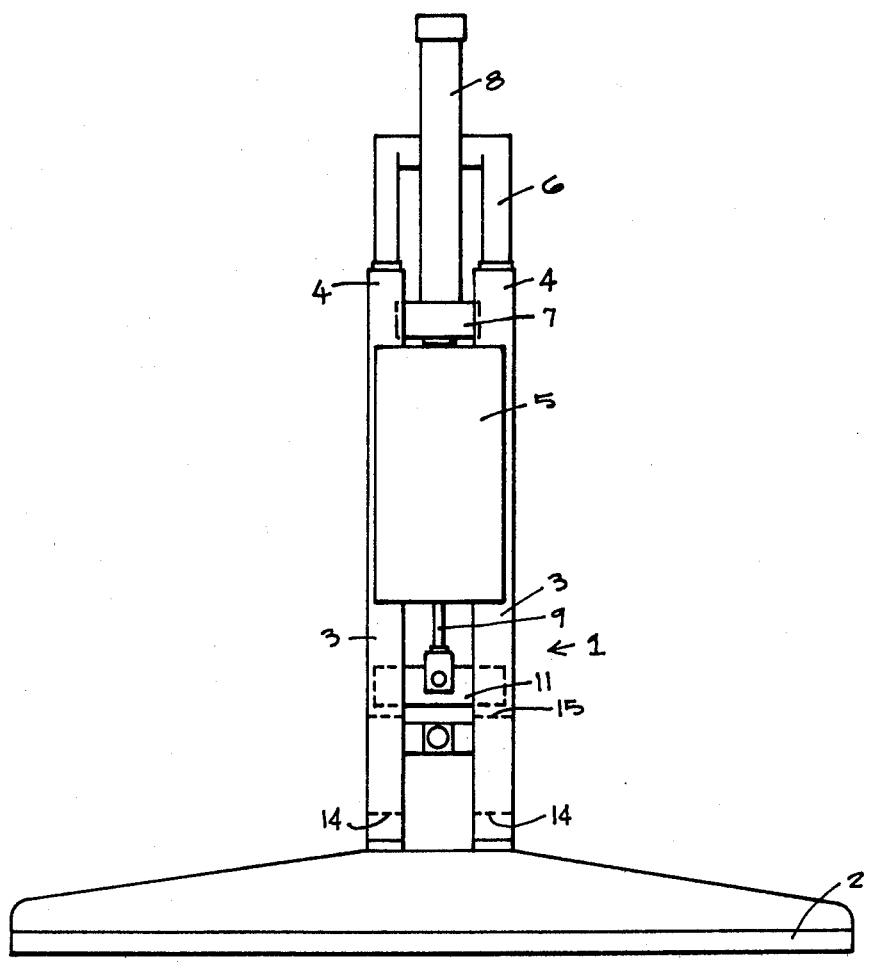
FIG. 2 is a side elevation of the portal crane of FIG. 1.
Figure 3:
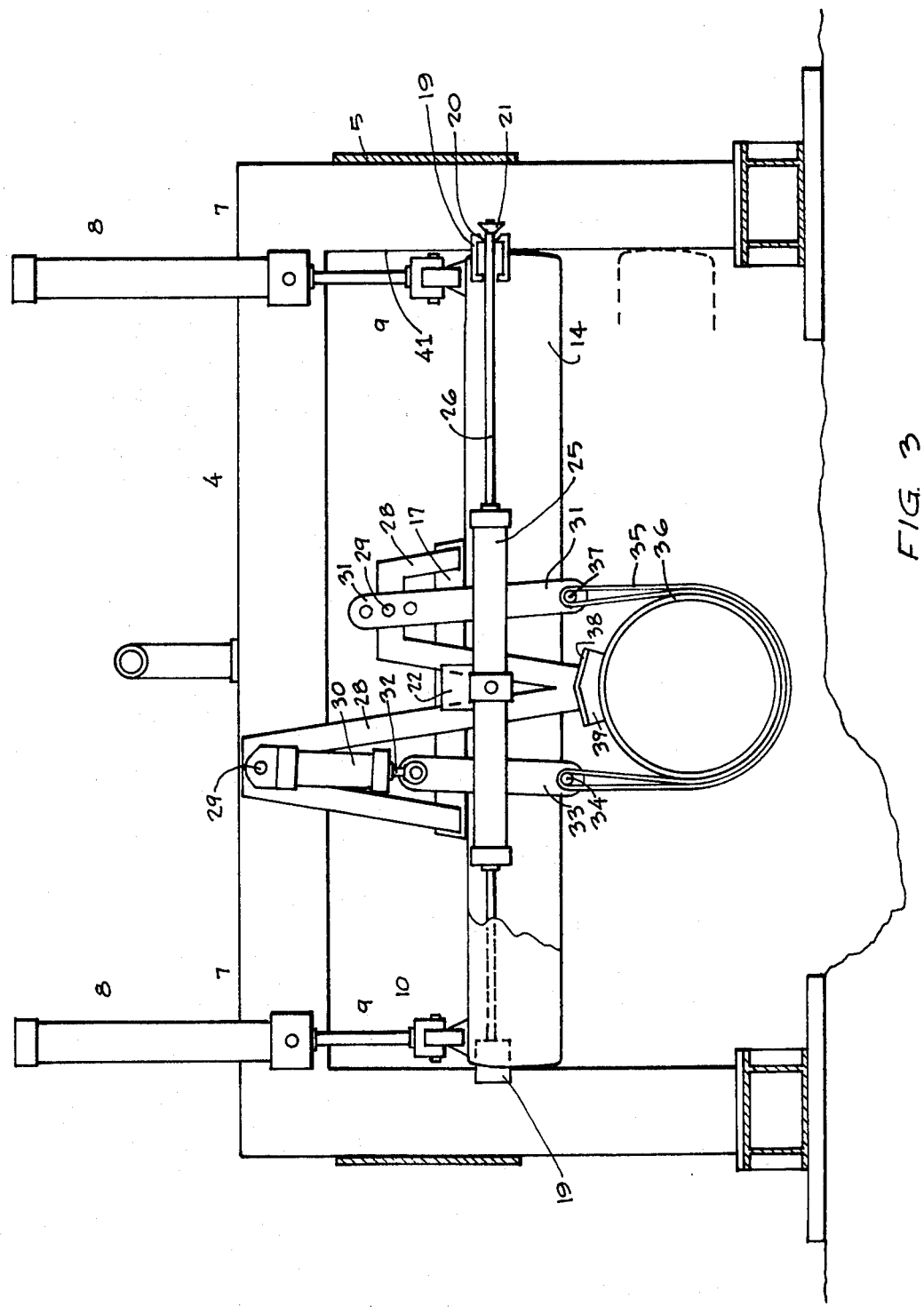
FIG. 3 is a front elevation of the portal crane of FIG. 1 and a portion thereof moved from the position shown in FIG. 1.

The apparatus of the invention can best be understood by reference to the Figures, wherein FIGS. 1, 2, and 3 are three views of the invention, comprising the portal frame 1 with footings 2, columns 3, top-beams 4, spacer coupling 5, and pickup 6. The frame 1 houses gimbals 7 for double acting rams 8 with rods 9 supporting clevises 10 to supporting singletrees 11 mounted to four pillow blocks 12. By means 7, 8, 9, 10 and 11, the loose-beam apparatus 13 is supported. Apparatus 13 includes the two runway-beams 14 with runways 15, being the smoothed top surface of beams 14. The trolley sled 16 has runners 17 with machineway plastic bearing material 18 cemented to the bottom thereof for sliding along the runways 15. Referring now to FIG. 3 the runway beams 14 are spaced apart and held together and loosely guided vertically all by means of the spacer tubes 19 having holes 20 and countersunk conical seats 21 therein. The sled runners 17 mount support plates 22 for gimbals 23 supporting center trunnion 24 of double acting ram 25. The ram 25 is double ended, and the rod 26 at each end extends through the holes 20 and conical seat 21 of tube 19. There are two conical nuts 27, one at each end of the rod, loose enough to allow the ram 25 to align itself without bending, by seating a nut 27 into a seat 21 while turning in the gimbal 23.

Sled 16 has columns 28 mounting pins 29 for supporting the short ram 30 at the left and the adjustable link-plates 31 at the right in FIGS. 1 and 3. The ram 30 swings from the pin 29 and has rod 32 supporting non-adjustable link-plates 33 straddling ram 25 and removable supporting pin 34 holding up webbing sling 35 which is wrapped around the pipe 36, and is held at its other end to the link-plates 31 by removable pin 37. Columns 28 have a shoe 38 with pads 39.

The beams 14 have rounded ends 40 for bearing on the bearing surface 41 of the insides of columns 3. This rounding allows non parallel motion of the beams 14 relative to beams 4.

The purpose of the portal crane of FIGS. 1, 2 and 3 is to lift and lower heavy loads and to force them sideways, especially such loads as the submarine pipeline 36. The operation is as follows. The plates 31 will be adjusted for the size pipe to be picked up by adjusting pin 29. The portal crane will be lowered to the marine floor from shipboard by a shipboard crane (not shown) to a position astraddle a marine pipeline such as 36 to a position as in FIG. 1 or over other selected load. The lowering will preferably be under the direction of a diver. The diver will thread the sling 35 under the pipe, probably by jetting with his air or water hose, and will slip it between the link plates 33 and insert the adjustable locking pin 34. The diver will then operate ram 30 to snug the sling to the pipe and snug the pipe against the pads 39, thereby making unitary with sled 16.

The diver will then lift the pipe 36 by actuating rams 8, and he may move it traversely as far as position denoted by the dotted line marked 42, or to any other desired position between. Having gotten it over to the position 42, he may operate the rams 8 to force the pipe 36 against the marine floor to the extent of actually pushing the footings 2 free of firm purchase on the marine floor, and may then use the pipeline 36 as a foundation to support the whole portal crane. He may then operate the ram 25 to draw or "walk" the portal crane laterally to a new position. He may then operate the rams 8 to lift the pipe 36 again, or lift and position it however is suitable for coupling or other work.

The walking portal crane has considerable operational advantages over a shipboard crane, and the mechanism has economies and reliability resulting from the rounded ends, 40 of the runway beams 14 and from the simple arrangement. Other cranes have been built with rising and falling runway beams, but complicated linkages have been necessary to keep the beam moving at a constant attitude. The rounded ends 40 confined between the bearing surfaces 41 make such complex apparatus unnecessary. The articulation allowed and provided by means 7,8,9,10,11,12,19,23,24,25,26,27,40 and 41 all make elaborate guide machinery unnecessary.

These articulation means also allow slight motion of the runway beam assembly 13 in the direction of the pipeline, which will be seen to be important. This crane will be called an A-Portal crane.

Figure 4:
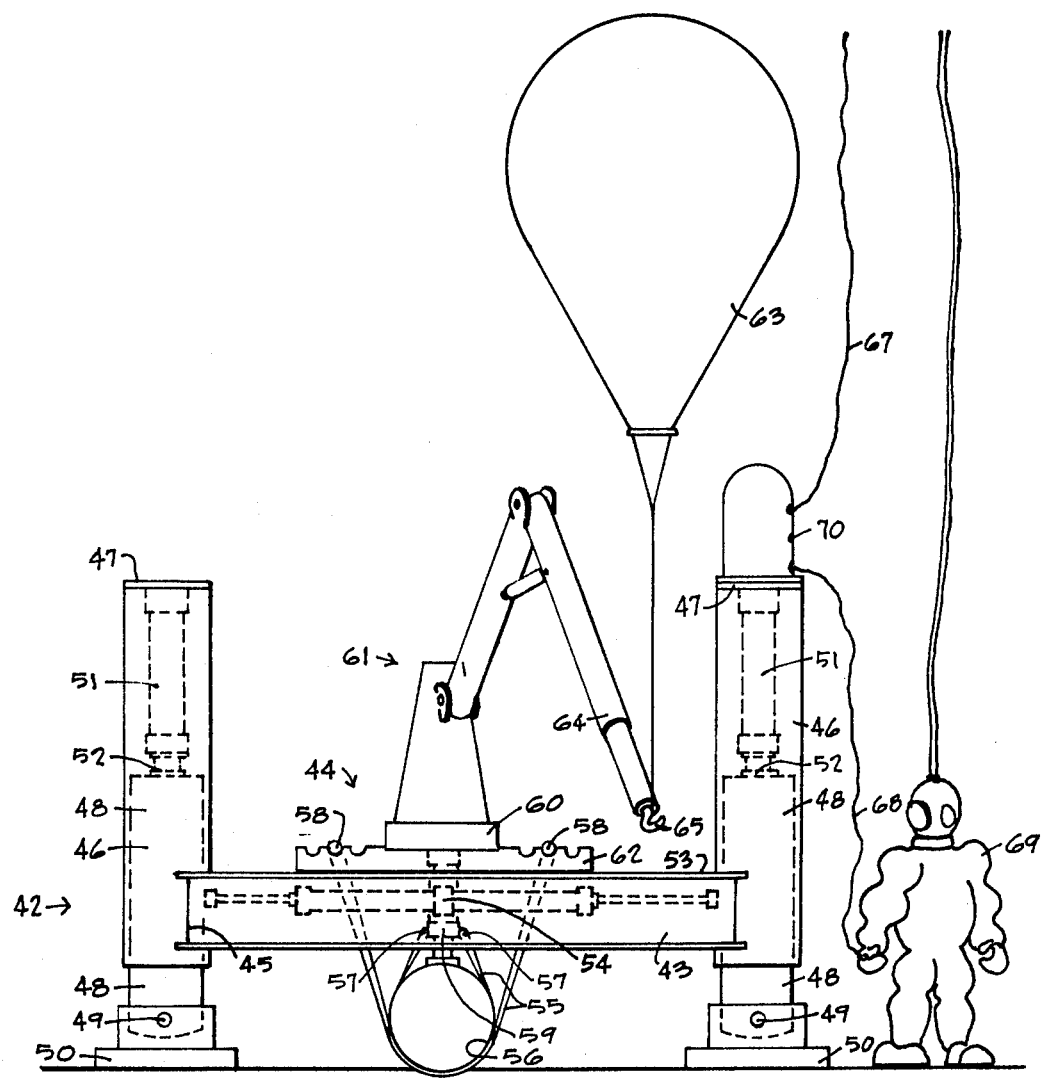
FIG. 4 is an alternate embodiment of the portal crane of the present invention.

Now consider FIG. 4, which shows another portal crane of the invention, but having also a jib crane or cherry-picker 61 (a name used in the art for a crane which has no great lifting capacity, but very precise positioning controls, and great reach) mounted on top, and having an underwater hydraulic power support, and having a balloon on the cherry-picker boom. This will be called an H-Portal frame herein.

The main frame 42 has a pair of parallel cross-beams 43 spaced apart with room for sled apparatus 44 on top and between and fixedly connected by welds 45 to cylindrical columns 46 having cap-plates 47, but being open at the bottom to receive cylindrical legs 48 mounted slidably therein. The legs 48 have pins 49 mounted to footings 50, so that the footing 50 may rotate somewhat about the pins 49 with respect to the legs 48. Hanging from and mounted on the plates 47 and within the columns 46 are rams 51 which act against cap means 52 mounted on legs 48 to urge said legs and columns in telescoping action, all for lifting the load and main frame 42 when the crane rests on the marine floor.

The beams 43 have an upper bearing surface 53 similar to the surface 15 on the beams 14. The sled assembly 44 slides crossways on the beams 43, also like the previous sled 16. This sled 44 has two rams instead of one such as 25 of FIG. 1, which are attached to post 59. The two rams are spaced apart to allow passage of slings 55 around the pipeline 56 and through the space between the beams 43 to be supported by pins 57 and 58. The pins 57 are attached to a post 59 which extends from the rotary base 60 of the cherry-picker 56, which spans the sled runners 62 riding the ways 53. The pins 58 span the runners 62 and rest in teeth in the rack-like top of runners 62, thus allowing adjustment of the slings for different pipe sizes. There is a balloon 63 tied to the telescoping boom 64 at its working end, having a hook 65 thereon. The crane has its own hydraulic power supply 66 mounted on plate 47, and supplied with electricity from the ship through the cable 67 controlled by the diver 69 through control cable 68. There is a hydraulic tap 70 for connecting to other underwater hydraulic apparatus.

The crane is operated by lowering from the ship to straddle the pipeline; the diver mounts the slings as with the A-portal crane. He operates the rams 51 and 54 similarly to rams 8 and 25, with similar effect. He can walk the crane. The different mounting of the slings is less complicated, and, in case of large lateral force in the absence of vertical force, as in walking, somewhat less secure. If needed, the other sling arrangement shown previously, could be employed on this crane, still within these teachings.

The H-crane is clearly different in respect to the balloon-assisted cherry-picker 61 which the diver can operate as follows: If he has heavy loads to pick up, larger than the cherry-picker 61 can pick up, he will use his air hose to fill the balloon 63 enough to lift most of the load, leaving only the balance of the vertical load, and all of any lateral load due to currents, to be handled precisely and safely by the cherry-picker. Thus is overcome a great disadvantage of the hoisting balloons of the prior art, to wit that they drift with the current, and may be vertically unstable. In case of light loads the balloon would be removed or left enpty of air, and the cherry-picker would act as it might act in air.

The A-crane might also have a cherry-picker mounted on the beam 4, and this is envisioned. But without the novel advantage found in mounting it on the sled of the H-crane, to wit, that it follows the pipe, thereby making it more convenient to work on the pipe. The jib crane means mounted on the top of the trolley (sled) allows handling of a first load in three degrees of freedom and above the trolley while the trolley lifts a second load.

FIG. 5 shows another simpler but less versatile crane, which will find application in some cases, and is shown to illustrate breadth of the present invention. The sled 71 is just the same as the sled 16 of FIG. 1, and the column assembly 72 is just the same as the assembly comprising 46, 47, 48, 49, 50, 51 and 52 of FIG. 4. The beams 73 are much like the beams 43, and connected to column assembly 72 much like the connection means of FIG. 4 at one end. On the other end, however, beams 73 bend downwards at the tubes pacer 74 resembling spacer 19 of FIG. 1, and are shaped to form a footing 75 which rests on the marine floor. Operation will resemble operation of the other cranes, but it will clearly be less versatile; it will serve in case low lift is allowable, but wide lateral motion is required; it will not be further described, since those of skill in the art will easily deduce its features and uses.

The present invention invisions the following novel and exemplary procedure, which can now be fully explained and understood by reference to FIGS. 6, 7, and 8.

Suppose each of a pair of pipe laying barges (not shown) has laid pipe 81 and 82 to a site offshore, coming from opposite directions, and each has dropped a flanged end 83 and 84 to the marine floor, so that the two ends are in only approximate and less than satisfactory alignment, as shown in FIG. 6, a plan view. The teaching here, as shown in FIG. 7, is for a diver 85 be lowered to the marine floor 86 along with two collapsed balloons 87 and 88 and walking portal cranes 89 and 90 such as cranes of FIGS. 1 and 4 respectively. The ship 80 then will place the portal cranes 89 and 90 astride pipes a short distance back from the flanges, 83 and 84 and the collapsed balloons 87 and 88 a much longer distance back. The diver will tie the balloons to the pipes and with his air hose fill the balloons enough to lift humps in the pipes, but just less than enough to lift the flanged ends, as shown in FIG. 8. The diver will then run slings under the pipe and tie the pipes to the portal cranes, with these beneficial results: The balloons hold a great length of pipe off of the floor, and make the ends thereof into a very long, and therefore very flexible cantilever. If the cantilever is flexible enough then the pipes can be bend with the H Frame using its reaction on the ground. The portal cranes may then manipulate the pipe, both laterally and vertically, relatively and absolutely, into good alignment, all under complete control of the diver, who does not have to depend on far removed operators of the shipboard cranes, and without the huge and costly unitary diving manipulators of the prior art.

The diver will then call the ship to ask for the gauge 92, which in this case is a telescoping rod with light-weight wobble flanges on the ends. The shipboard crane will release the guage onto the marine floor, and the diver will use the cherry-picker mounted atop the portal crane 90 to guage the opening. When he has done so, the guage will be read on shipboard, and a spool will be made to match. The spool-piece (not shown) will be lowered to the marine floor 6, where the diver will pick it up with the cherry-picker 91 and therewith position it between the flanges 83 and 84.

He will then complete the connection by first inserting two or three bolts or pins loosely into the holes in the flanges, and he then will call for a powered bolt and nut driver to be lowered to the bottom; he will pick up the driver with the cherry-picker and complete the connection with unusual speed and safety.

Errors in measurement or fabrication can be corrected by use of the portal cranes. Angular misalignment can be corrected by bending the pipes and axial movement can be accomplished by bending a verticle or horizontal hump in the pipe. Another approach is to pick up the pipes, measure the angle and separation of the pipes as they are found and fabricate a bent piece to fit, rather than trying to align the pipes before measuring. When the flanges are all tight, he can bleed the balloons 87 and 88 down while, if necessary, walking the portal cranes to form a long sweep in the pipe, and lay it back to rest on the bottom, with connection complete. He will then release all of the apparatus for pickup by shipboard crane. The shipboard crane will collect it all, the diver will surface, and they will depart.

In addition to the apparatus disclosed here and above, tension devices mounted from the surface, such as heave compensators may be employed. These devices are known in the art and are used to maintain a predetermined load on cables, as opposed to a predetermined position. The tension devices may be hoist systems, such as cranes which may be connected to the material to be handled by the portal cranes of the present invention for example a cable connected to a crane mounted on board a surface vessel and tensioned to relieve a substantial part of the load to be handled by the portal frames of the invention. For example, 95% of the load to be handled by the portal crane could be relieved by the appropriate tension devices located on the surface, thereby leaving only 5% of the total load of the pipe resting on the marine floor, to be handled by the portal crane. This embodiment of course may be applied to all of the portal crane embodiments described here and above.

Now it will be clear to those skilled in the art that considerable variation in the above can be practiced, still obtaining the benefits. For example, in case of very heavy spool pieces, the cherry-picker might be assisted by attaching a balloon to its hook end. In case of very strong unsteady currents, the balloons for humping the pipe might be stabilized by another pair of portal cranes placed near them. In case of very heavy pipes, the portal cranes near the flanges might have balloons to assist. In case of water too deep for divers, each of the portal cranes could have two cherry-pickers, with various tools for manipulation and coupling and including a television camera for remote viewing, and with surface or submarine apparatus for remote control. In case of need, adjustable fittings could be used, as for diverless operation.

These special advantages of the practices just described should be noted well:
1. The diver is in control of his own safety;
2. The alignment is very precise, and the coupling; secure;
3. The apparatus is conceptually simple and reliable;
4. The method is adaptable to widely varying conditions;
5. It is much safer than any economical scheme known in the art;
6. It is much cheaper than any safe scheme known in the art.

The invention claimed is:
1. A crane for use under water comprising:
a frame having a column and a beam connected to said column,
a powered thrusting means for raising and lowering said beam, mounted in said column,
a footing for contacting the marine floor, and articulately attached to a leg, said leg being attached to powered thrusting means, thereby allowing unequal raising and lowering of the beam,
a sled slidably mounted on said beam, said sled having a powered rotary mounted telescoping boom thereon allowing handling of a first load in three degrees of freedom and above said sled while said sled lifts a second load,
a powered thrusting means for lateral movement mounted to said beam,
means coupling said sled to said lateral thrusting means, and
means for suspending objects from said sled.

2. A crane for use under water according to claim 3 having two columns, and a beam connecting said columns.

3. The crane according to claim 1 wherein said powered thrusting means comprise hydraulic powered rams.

4. The crane according to claim 1 wherein said means for suspending objects from said sled comprises a sling.

5. The crane according to claim 1 wherein said telescoping boom has a gas inflated balloon attached to said boom.

6. A crane for use under water comprising:
a frame having a column and a beam connected to said column,
a powered thrusting means for raising and lowering said beam, mounted to said column,
a footing for contacting the marine floor, and attached to said powered thrusting means by a leg,
a sled slidably mounted on said beam, said sled having a powered rotary mounted telescoping boom thereon allowing handling of a first load in three degrees of freedom and above said sled while said sled lifts a second load,
a powered thrusting means for lateral movement mounted to said beam,
means coupling said sled to said lateral thrusting means, and
means for suspending objects from said sled.

7. The crane for use underwater according to claim 6 wherein said leg is articulately attached.

8. The crane for use underwater according to claim 6 wherein there is a plurality of columns connected to said frame, powered thrusting means, footings and legs.

9. The crane for use underwater according to claim 8 wherein said powered thrusting means are powered independently.

* * * * *